United States Patent [19]

Suzuki

[11] 4,384,631
[45] May 24, 1983

[54] POWER STEERING MECHANISM

[75] Inventor: Akira Suzuki, Nishio, Japan

[73] Assignee: Aisin Seiki Kabushiki Kaisha, Kariya, Japan

[21] Appl. No.: 218,679

[22] Filed: Dec. 22, 1980

[30] Foreign Application Priority Data

Dec. 28, 1979 [JP] Japan .................................. 54-172271
Jun. 12, 1980 [JP] Japan ................................ 55-82017[U]

[51] Int. Cl.³ ............................................. B62D 5/08
[52] U.S. Cl. ...................................... 180/143; 91/434
[58] Field of Search ............... 180/143, 142, 141, 132; 91/380, 434

[56] References Cited

U.S. PATENT DOCUMENTS 3,602,101  8/1971  Jablonsky et al. .................... 91/422
3,739,868  6/1973  Maekawa et al. .................... 180/143
3,833,081  9/1974  Suzuki ................................ 180/143

Primary Examiner—John A. Pekar
Attorney, Agent, or Firm—Oblon, Fisher, Spivak, McClelland & Maier

[57] ABSTRACT

A power-steering device using hydraulic pressure is provided of a construction utilizing a ball nut on a steering spindle worm disposed in a pressure piston wherein the ball nut is housed within the piston and actuates a spool valve which controls pressure to and from both ends of the piston. The valve itself is carried in the piston transversely of the axis, is displaced radially therefrom and is driven by an actuator connected with the ball nut. The device has a housing providing suitable flow passages for pressure feed to and exhaust from the valve, the piston having elongated longitudinal passage, among others, which maintain flow communication with housing passages at all positions of the piston. The piston further carries a regulator valve which restricts a pressure differential between the chambers at both ends of the piston for a higher level vehicle speed, for safety steering purposes.

7 Claims, 5 Drawing Figures

POWER STEERING MECHANISM

BACKGROUND OF THE INVENTION

1. Field of the Invention

This invention relates generally to a hydraulic power steering mechanism for a vehicle, and more particularly to improvements in providing a hydraulic power assistance output to a somewhat lesser extent in case of a higher level vehicle traveling speed than would be the case for a lower level vehicle speed.

2. Description of the Prior Art

While many attempts have been proposed in moderation of behavior of the hydraulic power steering mechanism at the higher level vehicle speed, none have proven to be entirely sufficient due to lacking the intended moderation character when the manual steering wheel operation speed is slowed. The moderation is required for safety purpose, since the general purpose of power assistance is concerned with use of a lower level vehicle traveling speed rather than a higher speed which would result in a tendency towards excessive power assistance due to a natural decrease in steering resistance.

SUMMARY OF THE INVENTION

A principal object of the present invention is to provide an improved hydraulically powered steering mechanism which has a desirable moderating capability, even in case of a slowed steering wheel speed, as well as when the vehicle is travelling at a higher level speed.

The foregoing object of the invention is attained according to at least one aspect of the present invention by the provision of orifice means hydraulically operable in response to a higher vehicle speed for decreasing pressure differential between two pressure chambers at both ends of a double-acting piston of the booster cylinder.

Thus the embodiments comprises a housing having a cylinder and a double-acting pressure piston therein with a pressure chamber at each end of the piston; a nut rotatably mounted within the piston and a steering shaft worm extending into the piston and drivably coacting with the nut; a valve actuator carried by the nut and being disposed within the piston, wherein initial rotation of said worm in steering movement effects rotation of said nut and rotative motion of the valve actuator about the worm axis; a control valve carried by the piston and being engaged for reversible movement by the valve actuator; pressure fluid passage means for conducting fluid to either chamber to pressurize an end of the piston responsive to movement in a respective direction of the control valve; a regulator valve carried by the piston and engaged for movement against a spring biased by fluid pressure developed proportionally to vehicle speed, three orifice means in the regulator valve for restricting the pressure fluid passage means leading to the both chambers and simultaneously fluidically communicating the chambers with each other, respectively, in response to movement against the spring biasing of the regulator valve.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views and wherein.

DETAILED DESCRIPTION OF THE PREFERRED EMBODIMENTS

Figure 1:
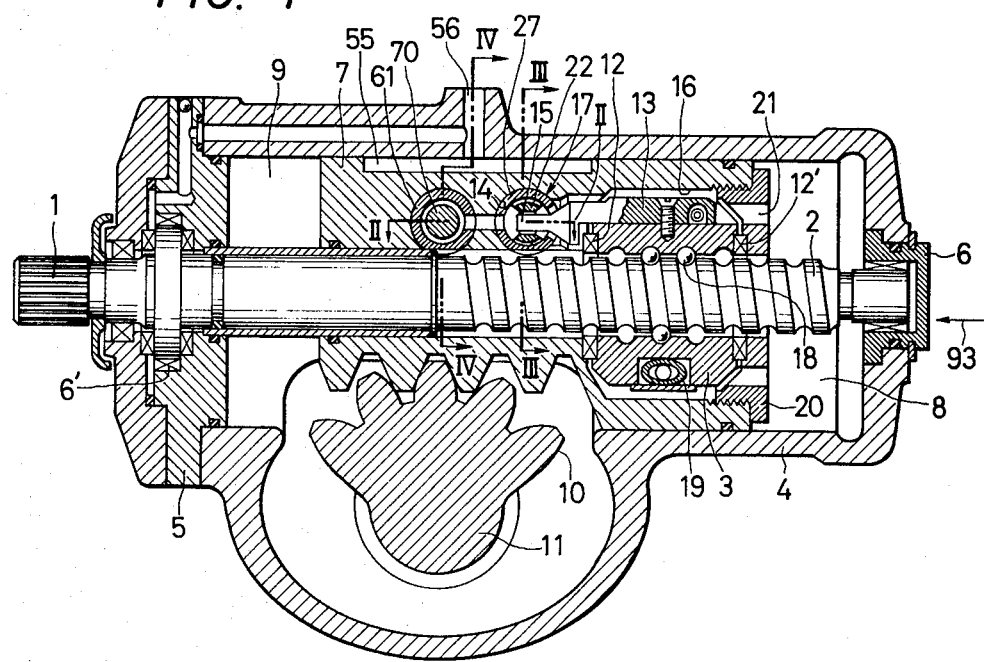
FIG. 1 is a longitudinal cross sectional view of one embodiment of the invention.

Referring to FIG. 1, the invention comprises a steering spindle 1, which will be understood to shown at an outer end for connection to a steering column, which spindle has a threaded groove or worm 2 for a ball drive connection of a ball nut 3. The entire mechanism is contained within a closed housing 4, wherein the steering worm 2 is supported at the spindle end in a bearing 6' suitably carried in an end cap 5, secured to the housing. The other end of steering worm 2 is socketed in a bearing 6 carried at the opposite end of the housing 4, as shown. The housing forms a double-acting cylinder for a pressure booster piston 7 having respective ends facing into cylinder pressure chambers 8 and 9. The piston 7 is provided with the usual gear rack coacting with gear sector 10, which will be understood to drive the steering gear shaft 11 for actuating a steering mechanism. The gear sector 10 is exposed within pressure chamber 9 and, therefore, it will be understood that shaft 11 is suitably sealed at its ends, as later described.

Piston 7 carries a pair of thrust bearings 12 and 12' between which is disposed the ball nut 3, which carries a valve actuator, an elongated member 13, which is disposed parallel to the axis of the construction, i.e., the cylinder, piston and ball nut 3. Actuator 13 has a drive finger 15 which extends through a bore 16 in the wall of piston 7 and has a leftward extremity engaged in a pressure control valve 17 for actuation thereof. The bore 16 has a somewhat larger diameter than the portion of finger 15 passing therethrough to serve as a limit stop to finger movement. Thus the ball nut 3 has a translational driving connection via balls 18 and a ball return tube 19 with each steering worm 2 in a well known manner. However, the ball nut 3 also has slight rotational play around the axis of worm 2 to the extent permitted by the portion of finger 15 which passes through bore 16, due to the slightly larger diameter of bore 16. Accordingly, if the steering worm 2 is rotated it will initially effect rotation of ball nut 3 therewith, in a direction either into or out of the plane of the drawing viewed on FIG. 1 until such rotation is stopped by engagement of the portion of finger 15 with one side or the other of bore 16. It will be noted that ball nut 3 has no axial movement within piston 7, being secured to against axial movement by thrust bearings 12 and 12' retained in assembly by a ring 20 threaded into the end of the piston 7. Ring 20 is provided with flow passage bores 21 for a purpose which will be explained as the description proceeds.

Figure 2:
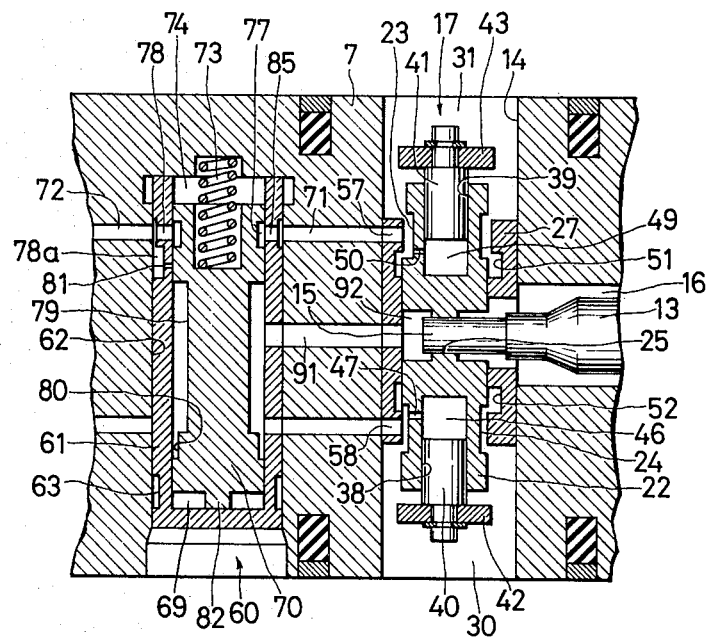
FIG. 2 is a sectional view taken along line II—II of FIG. 1.

From what has been thus far described, it will be apparent that rotation of the steering spindle 1 will swing actuator 13 toward or away from the viewer as seen in FIG. 1, and by referring to FIG. 2, it will be noted that the extremity of finger 15 of actuator 13 can move left or right (also see FIG. 3) to shift a reciprocal valve 22 of the pressure control valve 17 within a valve sleeve 27 and which sleeve 27 is secured in piston 7 in a bore 14 transversely of the axis and radially spaced therefrom. The valve spool 22 is provided with a radial bore 25 for the driver end 15 (FIG. 2) of actuator 13 and such bore 25 is slightly widened to allow radial play (see FIG. 3) for finger 15 in moving in an arc within bore 25.

Valve spool 22 is provided with grooves 23 and 24 is maintained in proper alignment and is slidingly supported in valve sleeve 27 by the other land portions therebetween. The bore 14 in piston 7 which carries valve 17 connects through a pair of recess cuts 30 and 31 (FIG. 3), and a pair of drilled passages 32 and 33 with a passage 34 oriented transversely of the axis of the piston 7 and radially spaced therefrom. The passage 34 connects with a longitudinal groove 35 sealed by sealing ring 37 which faces the exterior surface of piston 7 and provides a sealing and sliding fit within the cylinder in which the piston 7 reciprocates. The groove 35 extends to the extent that an inlet 36 is in communication with the groove throughout the full length of the stroke of the piston 7 in operation.

Spool valve 22 is provided with axial bores 38 and 39 for respective reaction pistons 40 and 41 which are secured by respective brackets 42 and 43 (FIGS. 2 and 3) to piston 7 by means of respective screws 44 and 45. The reaction piston 40 cooperates with bore 38 to define a cavity 46 which communicates through a radial bore 47 with the groove 24 as shown in FIG. 2. The other reaction piston 41 cooperates also with bore 39 to define a cavity 49 which communicates through a radial bore 50 with the groove 23. Accordingly, pressure in grooves 23 and 24 will be manifest inside respective reaction pistons 41 and 40 to act against the adjacent ends of valve spool 22, bores 39 and 38. This provides simulated steering resistance.

Figure 3:
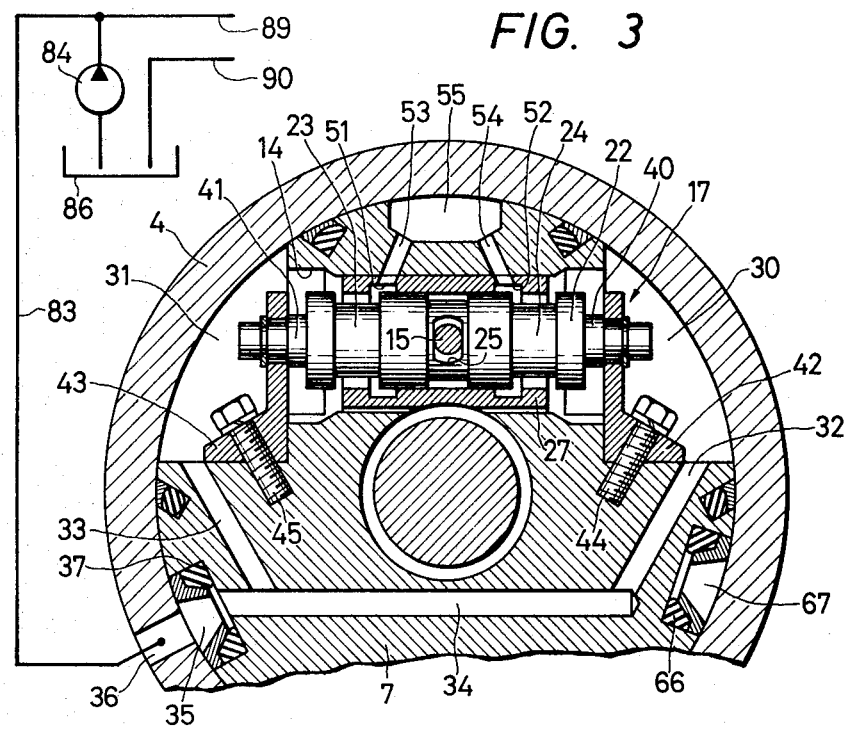
FIG. 3 is a sectional view taken along line III—III of FIG. 1.

Valve sleeve 27 has in its integral face a pair of spaced grooves 51 and 52 as shown in FIG. 3. These grooves 51 and 52 connect through respective bores 53 and 54 to a common longitudinal exhaust groove 55 which in turn connects to an outlet port 56 shown in FIG. 4. Valve sleeve 27 is further provided with a pair of spaced bores outwardly of respective grooves 51 and 52. The bores 57 and 58 extend to an orifice or regulator valve shown in FIG. 4 generally by numeral 60 and described hereinbelow.

Regulator valve 60 has a valve sleeve or cylinder 61 secured in piston 7 in a bore 62 transversely of the axis and radially spaced therefrom. Sleeve 61 has an external annular groove 63 connecting through a bore 64 in piston 7. Bore 64 connects to a longitudinal groove 67 which in turn communicates with an inlet port 65 and is sealed by a packing 66. The groove 63 further communicates through a bore 68 with interior of the sleeve 61, a pressurizing chamber 69 defined by sleeve 61 and a piston 70. Sleeve 61 has another external annular groove groove 71 which provides orifice means as later described in greater detail. As shown in FIG. 2 groove 71 connects to both of bore 57 and an output port 72.

Figure 4:
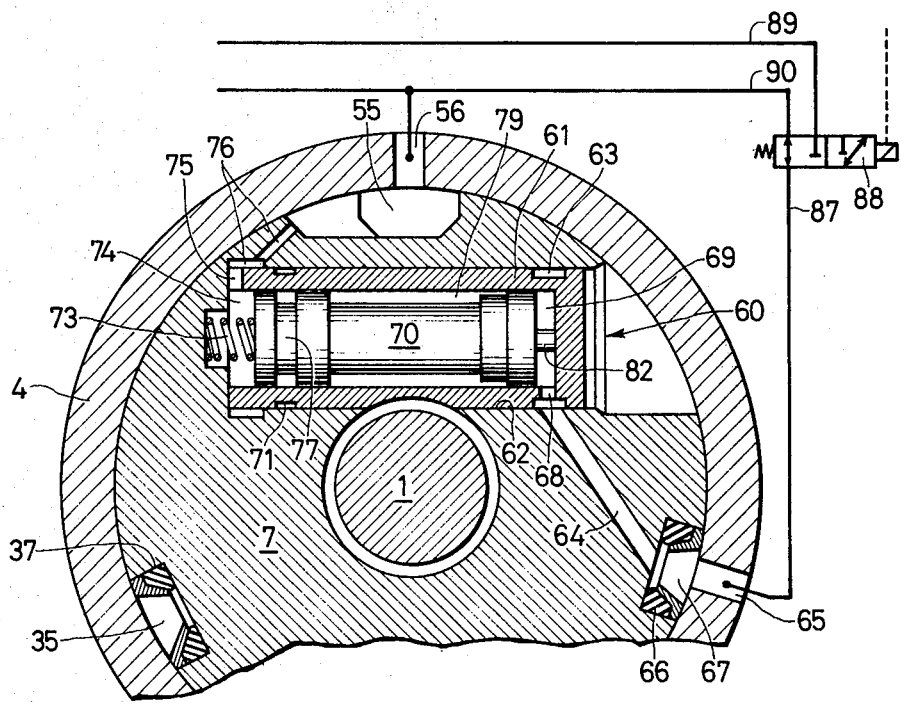
FIG. 4 is a sectional view taken along line IV—IV of FIG. 1.

Sleeve 61 effects a cylinder for piston 70 having one end facing into cylinder pressure chamber 69. A coiled compressed spring 73 is captive in a cavity 74 defined by the other face and bore 62. Cavity 74 communicates through a notch 75 and a bore 76 to the common outlet groove 55. Piston 70 is provided with an annular comparatively deep groove 77 (FIGS. 2 and 4) which normally connects to bore 57 and output port 72 through bores 78, 85 in sleeve 61, respectively. Bores 78 and 85 open in orifice groove 71 for the sake of structural convenience. Piston 70 has another wider groove 79 in the external face neighboring land 80 which cooperates with another output port or bore 58 as described later in greater detail. Piston 70 is provided with in the acting face thereof a projection 82 normally urged toward abutment against the adjacent internal face of cylinder 61 by spring 73 as shown in FIG. 4. As shown in FIG. 3, inlet port 36 communicates through a line 83 with a pump 84 while outlet longitudinal groove 55 in piston 7 elongates axially up to the orifice valve 60 (FIG. 4) and communicates through outlet port 56, and an exhaust line 90 with a reservoir 86. In FIG. 4, inlet port 65 communicates through a line 87 with a solenoid changeover valve 88 which in turn communicates through lines 89 and 90 with pump 84 and reservoir 86, respectively. Solenoid valve 88 is electrically connected to a speed sensor (not shown) from which signals are emitted so that position of the solenoid valve 88 is changed. In the position shown, inlet port 65 is in communication with reservoir 86, whereas port 65 communicates with pump 84 through solenoid valve 88 where a signal is emitted from the sensor when the vehicle is traveling at a higher level speed.

Referring to the mode of operation of the invention shown in FIGS. 1 to 4, when control valve 17 is in centered or neutral position, the pressure fluid circulates in a substantially pressureless manner from pump 84 through line 83 to the inlet port 36, bores 34, 33, and 32, recess cuts 30 and 31 to the ends of control valve 17. At this time the edges of the spool valve which coact with the adjacent groove inner edges of sleeve 27 are spaced or open and oil flows via grooves 23 and 24 (FIG. 3) to grooves 51 and 52, bores 53 and 54, longitudinal common groove 55, to return or exhaust port 56 (FIG. 4). Should the steering spindle be rotated, for example, for a right turn, the ball nut 3 will be turned accordingly, with some slight linear movement simultaneously along with the piston 7 since the ball nut 3 is axially locked by bearings 12 and 12' within the piston. However, the ball nut 3 has a slight rotational movement and experiences such movement at this time until being stopped by the actuator 13 and hence finger 15 engaging an edge of bore 16. Valve spool 22 is thus shifted by finger 15 to the extent permitted by the diameter of bore 16. This causes valve spool groove 23 to further open connection with valve spool groove 51, but cuts off the connection between valve spool groove 24 and valve sleeve groove 52. As a result recess cut 30 (FIG. 3) with pressure fluid from the inlet port 36 therein is closed, fluid pressure increases and fluid then flows through bores 34 and 32, recess cut 30, to groove 24, bore 58 in piston 7, groove 79 in piston 70, bore 91, groove 92, bore 16, bore 21 in threaded ring 20 to the chamber 8 (FIG. 1), acting on piston 7 in the direction of the arrow 93 in FIG. 1. Simultaneously with the above action, chamber 9 is exhausted via bore 72 (FIG. 2), groove 71, bore 78, groove 77, bore 85, groove 71, bore 57, grooves 23, 51, bore 53 (FIG. 3), common groove 55, to outlet port 56 (FIG. 4). The reaction pistons 40 and 41 are simultaneously subjected to respective pressures of the pressure chambers 8 and 9.

For example, with the functioning of the mechanism as explained above, inlet pressure in groove 23 is communicated via bore 50 (FIG. 2) to bore 49 and exhaust pressure in groove 24 is communicated via bore 47 to bore 46. There is thus differential pressure on the ends of valve spool 22 which opposes the shifting movement in a manner proportional to the steering force applied so that the driver must overcome a simulated steering resistance although to a somewhat lesser extent than would normally be the case without the hydraulic assistance of the booster cylinder.

For a reversed turn, the flow functions described above are reversed as will be apparent to persons skilled in the art due to the symmetry of the arrangement of the passage means, except that pressurized fluid in recess cut 31 flows through groove 23, bore 57, groove 71, bore 85, groove 77, bore 78, groove 71, output port 72, and to the chamber 9 (FIG. 1).

Operation of the regulator or orifice valve 60 is described hereinbelow. When the vehicle accelerates over a predetermined speed, solenoid valve 88 (FIG. 4) cuts off communication between port 65 and reservoir 86, but permits communication between pump 84 (FIG. 3) and port 65. As a result fluid from pump 84 flows through line 89, solenoid valve 88, line 87, port 65, groove 67, bore 64, groove 63, bore 68, to the chamber 69, thus causing piston 70 to shift until the opposite end abuts the internal face of the bore 62 against the bias of spring 73. Land 80 of piston 70 provides an orifice for bore 58, while bore 57 is isolated from annular groove 77 but is permitted to communicate through orifice annular groove 71 with output port 72. It will be noted that fluid flow through both bores 58 and 57 is restricted by such orifice members and further both bores 58 and 57 are communicated with each other through large groove 79, orifice 81, recess portion 78a, groove 71, bore 78, groove 77, bore 85, groove 71. This results in a decreasing pressure differential between both output fluid pressures respectively in bores 58 and 57, so that the intended moderation of power assistance at a higher level vehicle speed is attained.

Figure 5:
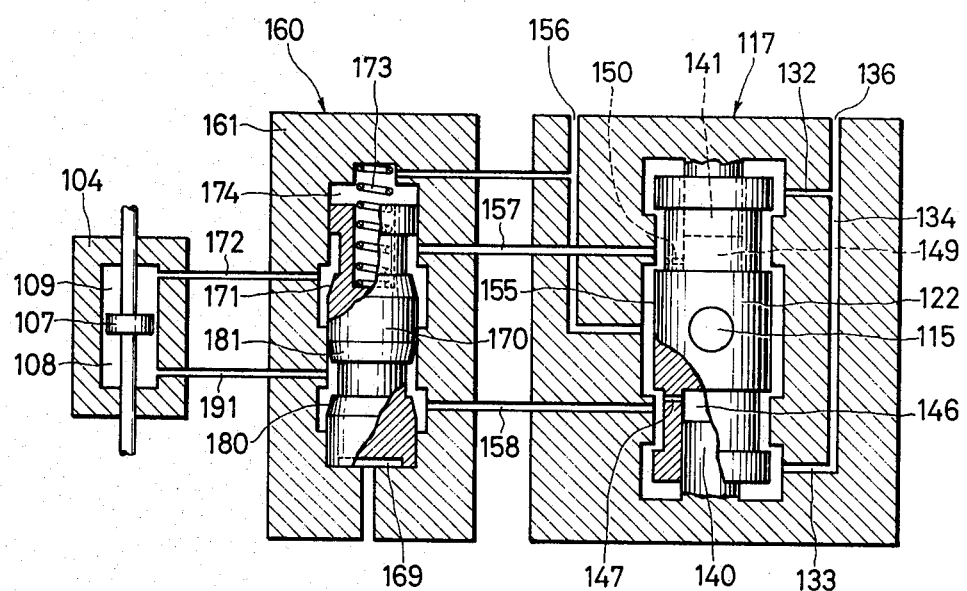
FIG. 5 is a sectional view similar to FIG. 2 of a second embodiment.

The second embodiment in FIG. 5 is shown by using the same reference characters in 100 series as those in FIGS. 1 to 4, so that duplicated descriptions will be abbreviated for completely understanding the second embodiment.

In FIG. 5, a regulator or orifice valve 160 comprises a housing 161 and a piston or stepped plunger 170 in the housing 161. Plunger 170 has lands having three tapered or conical faces 180, 181, and 171. When piston 170 is moved by fluid pressure built up in chamber 169 against spring bias of spring 173 until it abuts against the internal face of cavity 174, fluid flow through respective bores 191 and 172 is resisted by the orifices provided by tapered or conical faces 180 and 171 respectively, communicating with each other through the orifice provided by central tapered or conical face 181.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A power-steering mechanism having a shaft, a housing having a cylinder and a double-acting pressure piston therein operatively connected to said shaft and with a first and second pressure chamber formed, respectively, at each end of the piston comprising:

a nut rotatably mounted within the piston and a steering shaft worm extending into the piston and drivably connected with the nut;

a valve actuator carried by the nut and being disposed within the piston, wherein initial rotation of said worm by steering movement causes rotation of said nut and rotative motion of said valve actuator about the axis of the worm;

a control valve carried by the piston and being engaged for selective reversible movement with said valve actuator;

first and second pressure fluid passage means for conducting fluid to either said first and second chamber to pressurize an end portion of said piston so as to be responsive to movement in a respective direction of said control valve;

spring biased regulator valve means carried by the piston and engaged for movement by fluid pressure developed in response to vehicle speed, said regulator valve having first, second and third orifice means formed therein for restricting fluid flow through said first and second pressure fluid passage means leading to said first and second chambers and simultaneously communicating said first and second chambers with each other, respectively, in response to movement against spring biasing of said regulator valve; and reaction generating means for proportionally transmitting torque to the shaft in response to the pressure differential between the first passage means which is formed between the control valve and the first orifice means and the second passage means which is formed between the control valve and the second orifice means.

2. A mechanism as set forth in claim 1, wherein said piston has a bore formed therein and wherein said control valve further comprises a valve spool slidably carried in said piston in said bore transversely of and offset from the axis of said piston.

3. A mechanism as set forth in claim 1, wherein said valve actuator further comprises an elongated member disposed at one side of the axis of said piston and generally parallel to the axis of said piston;

said piston having rack teeth extending along an opposite side; and a gear sector for a steering mechanism in said housing meshing with said rack.

4. A mechanism as set forth in claim 1, wherein said control valve further comprises a valve spool having a bore and said valve actuator having a finger extending into said bore;

said piston having a bore formed therein offset from and generally transverse to the axis of said piston, and said control valve being carried in said bore of said piston;

wherein said valve actuator further comprises an elongated member extending generally parallel to the piston axis;

said piston having a wall with an aperture formed therein through which said valve actuator passes and said aperture being of predetermined diameter larger than the portion of the valve actuator passing therethrough whereby edges thereof serve as a limit of motion in either direction for said valve actuator for controlling the limit of movement of said control valve.

5. A mechanism as set forth in claim 1, wherein said regulator valve further comprises a cylinder and a plunger disposed therein with a vehicle speed responsive fluid pressure chamber and a spring biasing member located at one end thereof, and having a pair of first and second annular grooves provided thereon for simultaneously forming each of said first and second fluid pressure passage means, a first land for blocking said first fluid pressure passage means while substituting the first orifice means for said first fluid pressure passage means and opening the third orifice means for communicating said first and second chambers and a second land for simultaneously forming the second orifice means in said second fluid pressure passage means.

6. A mechanism as set forth in claim 1, wherein said regulator valve further comprises a cylinder and a plunger disposed therein with a vehicle speed responsive fluid pressure chamber and a spring biasing member located at one end thereof, and further comprising a first opposite double tapered land and a second single tapered land which further comprises said first, third and second orifice means, respectively, in response to movement of the plunger for restricting fluid flow therebetween.

7. A power-steering mechanism for a vehicle comprising:
 a housing forming a cylinder;
 a piston disposed in said cylinder so as to form a first and second pressure chamber at opposite ends of said piston;
 manually controlled valve means selectively fluidically connected with said first and second pressure chambers;
 first and second fluid operating passages connecting said manually controlled valve means with said first and second chambers;
 first and second orifice means disposed in said first and second passages, respectively; and
 third orifice means interconnecting said first and second fluid operating passages for enabling direct connection between said first and second chambers and for changing the orifice effect in response to change of vehicle speed.

* * * * *